United States Patent [19]

Magill et al.

[11] Patent Number: 5,987,014

[45] Date of Patent: Nov. 16, 1999

[54] MULTIPATH RESISTANT, ORTHOGONAL CODE-DIVISION MULTIPLE ACCESS SYSTEM

[75] Inventors: David T. Magill, Palo Alto; Horen Chen, Saratoga, both of Calif.

[73] Assignee: Stanford Telecommunications, Inc., Sunnyvale, Calif.

[21] Appl. No.: 08/274,556

[22] Filed: Jul. 14, 1994

[51] Int. Cl.[6] .................................................. H04J 13/04
[52] U.S. Cl. ........................ 370/335; 370/342; 375/200
[58] Field of Search .................................. 370/18, 19, 21, 370/22, 335, 342, 209; 375/200, 205, 206, 40, 96, 100, 208, 367; 455/52.1, 65

[56] References Cited

U.S. PATENT DOCUMENTS

| | | | |
|---|---|---|---|
| 5,103,459 | 4/1992 | Gilhousen et al. | 375/205 |
| 5,204,876 | 4/1993 | Bruckert et al. | 375/200 |
| 5,222,100 | 6/1993 | Lundquist et al. | 375/200 |
| 5,235,614 | 8/1993 | Bruckert et al. | 375/205 |
| 5,299,229 | 3/1994 | Zscheile et al. | 375/200 |
| 5,383,219 | 1/1995 | Wheatley et al. | 375/205 |

OTHER PUBLICATIONS

Dixon, R. *Spread Spectrum Systems With Commercial Applications*, p. 282, '94.

*Primary Examiner*—Chau Nguyen
*Attorney, Agent, or Firm*—Jim Zegeer

[57] ABSTRACT

The present invention is directed to the use of bandwidth efficient OCDMA in a multipath environment. The high rate PN code greatly attenuates multipath components that are delayed enough to have significant impact on the degree of orthogonality that may be achieved. By offsetting the carriers by the RW chipping rate and using precise network timing to align all accesses to a small fraction of a high rate PN chip duration, it is possible to fully utilize the available bandwidth. The procedure for achieving this time base alignment has been previously disclosed in U.S. patent application Ser. No. 980,957.

4 Claims, 5 Drawing Sheets

MULTIPATH RESISTANT, ORTHOGONAL CODE-DIVISION MULTIPLE ACCESS SYSTEM

BACKGROUND AND BRIEF DESCRIPTION OF THE INVENTION

Orthogonal code-division multiple access (OCDMA) has been proposed (U.S. patent application Ser. No. 980,957 now U.S. Pat. No. 5,375,140, incorporated herein by reference, and U.S. patent application Ser. No. 08/257,324 filed Jun. 7, 1994, incorporated herein by reference) as an effective technique for improving the capacity, i.e., bandwidth efficiency, of the more conventional quasi-orthogonal CDMA (QOCDMA). QOCDMA is frequently referred to as asynchronous CDMA since the chips (for direct sequence PN) or the hops (for pseudo-random hopping) are not aligned in time. As a consequence of the non-alignment, or asynchronicity, it is not possible to achieve true orthogonality and QOCDMA systems suffer from interference from other system users or what is commonly known as access noise. As a result of this access noise QOCDMA systems cannot achieve as high a capacity, i.e., number of channels, in a given amount of bandwidth as can an orthogonal system such as OCDMA.

As noted above, OCDMA requires time base alignment of all accesses and this can be done readily in star networks provided that the subscriber terminals, i.e., remote units, are not moving too quickly nor are too far removed from the base station, i.e., hub of the star network. In addition, there is another propagation condition that must be met that is of particular concern when the subscriber terminals employ antennas that do not have a great deal of directivity. In such situations there may be considerable multipath and the delayed path signals will contribute access noise since these signals being non-aligned in time will be non-orthogonal. However, if the multipath delay spread is small in comparison to the chip duration of the orthogonal codes, the impact of the multipath signals is negligible. By choosing a suitably low chipping rate and restricting operation to indoor environments, where the delay spread is quite small, this condition may be assured. Thus, the first application of OCDMA has been to a wireless PBX where these conditions can be met.

The object of the present invention is to extend this system to those environments where there is a significant delay spread in comparison to the duration of the orthogonal code chip duration.

THE PROBLEM

There are really two problems. One problem occurs at the subscriber terminal and the other at the base station. At the subscriber terminal the problem could be solved through the use of an equalizer which would remove or alleviate the effect of the multipath and restore orthogonality. However, at the base station this approach is not feasible since each signal traverses a different path to the base station and, consequently, has a different multipath profile. Thus, an equalizer operating on the composite signal is presented with an impossible task of simultaneously equalizing multiple paths. Thus, it is desirable to find a solution which may b e applied to both inbound and outbound links from the base station.

The object of the invention is to provide a solution which may be applied to both inbound and outbound links from the base station.

According to the present invention, the OCDMA system is made more tolerant of multipath delay spread by the introduction of high rate PN spreading where there are multiple, e.g., eight to 64 PN chips per each Rademacher-Walsh (RW) chip. The general concept is to set the PN chipping rate high enough such that the correlator in the demodulator will provide processing gain discrimination against multipath components delayed more than a small fraction of a RW chip. Thus, the impact of large delay components will be reduced by the PN processing gain. Small delay multipath components will have a negligible impact on performance (see D. T. Magill, F. D. Natali, and G. P. Edwards, "Spread-Spectrum Technology for commercial Applications", *Proceedings of the IEEE*, April 1994, pp. 572–584.) For example, if it is concluded that multipath components less than 5% of a RW chip duration will have negligible impact on system orthogonality, then using 20 PN chips per RW chip is sufficient to realize a substantial performance improvement.

Thus, use of a higher rate PN code provides protection against multipath fading due to components delayed by more than one PN chip. If the environment is such that it is certain that all components are delayed by at least one chip, then the need for antenna diversity can be avoided.

As presented so far the high rate PN code has been introduced only for multipath suppression which is obtained at the price of a substantially higher bandwidth requirement resulting in poor system bandwidth efficiency as compared to OCDMA. The present invention system design has two approaches for solving this problem.

The first approach is to simply use QOCDMA to increase the capacity of the occupied bandwidth. Other high rate QO PN codes would be assigned to sets of self-orthogonal users. The disadvantage of this system is that QO access noise would result from these other sets of users. In a typical situation the majority of accesses would no longer be orthogonal and the performance would be that of a QOCDMA. While this improves capacity beyond that achieved with a single high rate PN code (and single carrier frequency) it does not result in the best achievable performance. Nevertheless, in many cases it is a practical approach to enhancing the performance of an existing OCDMA system operating in a multipath environment. It should be noted that the resulting system offers little, if any, bandwidth efficiency advantage with respect to the more conventional QOCDMA.

The second, and much preferred, embodiment presented by the invention utilizes orthogonal frequency-division multiple access to increase the bandwidth efficiency. With this approach, new accesses are introduced by replicating the existing signal structure (including the same PN code) at carrier offsets at multiples of the RW chipping rate. While the spectra overlap, so long as all of the signals are timed to a small fraction of a RW chip duration, the signals will be essentially orthogonal. Furthermore, for those multipath components delayed by more than one high rate PN chip the delayed component will be reduced by the PN processing gain. Thus, while performance may be degraded somewhat from truly orthogonal system performance, it will be superior to that achievable with QOCDMA.

For the first approach the transmitted signal set is given by:

$$S_{ik}(t) = PN_{HR,k}(t) \cdot PN_{LR,k}(t) \cdot RW_i(t) \cdot [a(t)+jb(t)] \cdot \cos(\omega_o t)$$

where $PN_{HR,k}(t)$ is the high rate PN code for the k-th set of accesses, $PN_{LR,k}(t)$ is the low rate PN code for the k-th set of accesses (necessary to randomize and equalize the properties of the different RW functions which are inherently different), $RW_i(t)$ is i-th RW function, and $[\alpha(t)+jb(t)]$ is the complex-valued baseband data modulated signal (typically a QPSK signal but high order modulation may be desirable in some circumstances).

For the second approach the transmitted signal is given by:

$$S_{ik}(t)=PN_{HR}(t) \cdot PN_{LR}(t) \cdot RW_i(t) \cdot [\alpha(t)+jb(t)] \cdot \cos(\omega_o t + \delta\omega \cdot k \cdot t)$$

where the notation is generally the same as above. The subscript k has been dropped on the two PN codes since the same codes are used for all accesses. The additional sets of accesses are supported by angular frequency offsetting by the amount $\delta \cdot k$ which corresponds to $2\pi$ times integer multiples of the RW chipping rate.

Demodulators for the base station differ in that the delay discriminator output is not used to control the local correlator time base. Rather, the delay discriminator output is transmitted to the subscriber terminal by way of an order wire as described in U.S. Pat. No. 5,375,140.

DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 1:
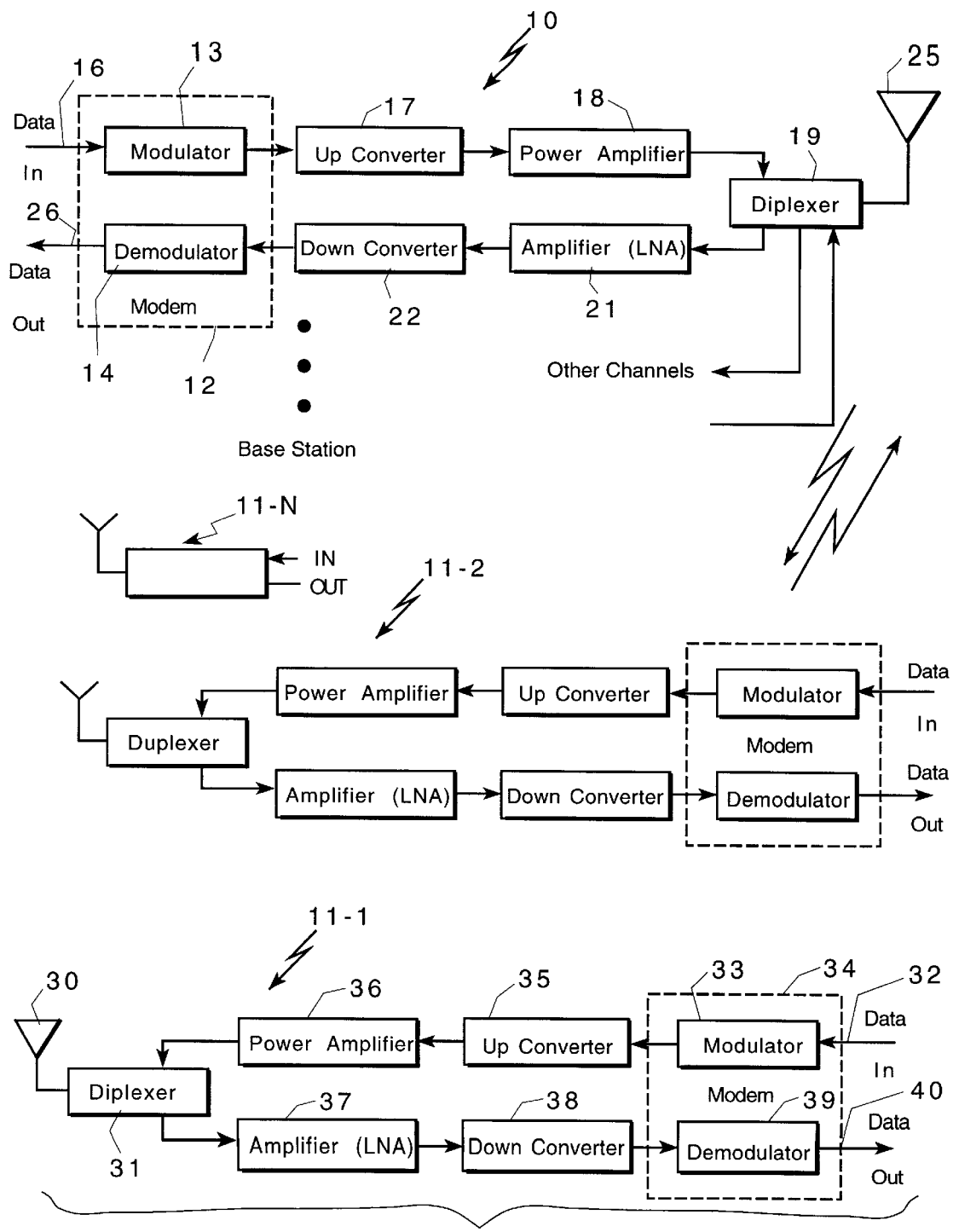
FIG. 1 is a block diagram of a multipath resistant, orthogonal code-division multiple access digital cellular telephone system incorporating the invention.

In the drawings, the following legends apply:

| | |
|---|---|
| QASK | Quadrature Amplitude Shift Keying |
| QPSK | Quadri-phase Shift Keying |
| VCO | Voltage-controlled Oscillator |
| I&D | integrate-and-Dump Circuit |
| LPF | Low-pass Filter |
| Im{•} | Imaginary Part of |
| (•)* | Complex Conjugate |
| SGN(•) | Sign of Real and Imaginary Parts |
| (•)² | Squaring Operation |
| ⊗ | Complex Multiply |
| D/2 | Delay by ½ High Rate Chip |

DETAILED DESCRIPTION OF THE INVENTION

Figure 4:
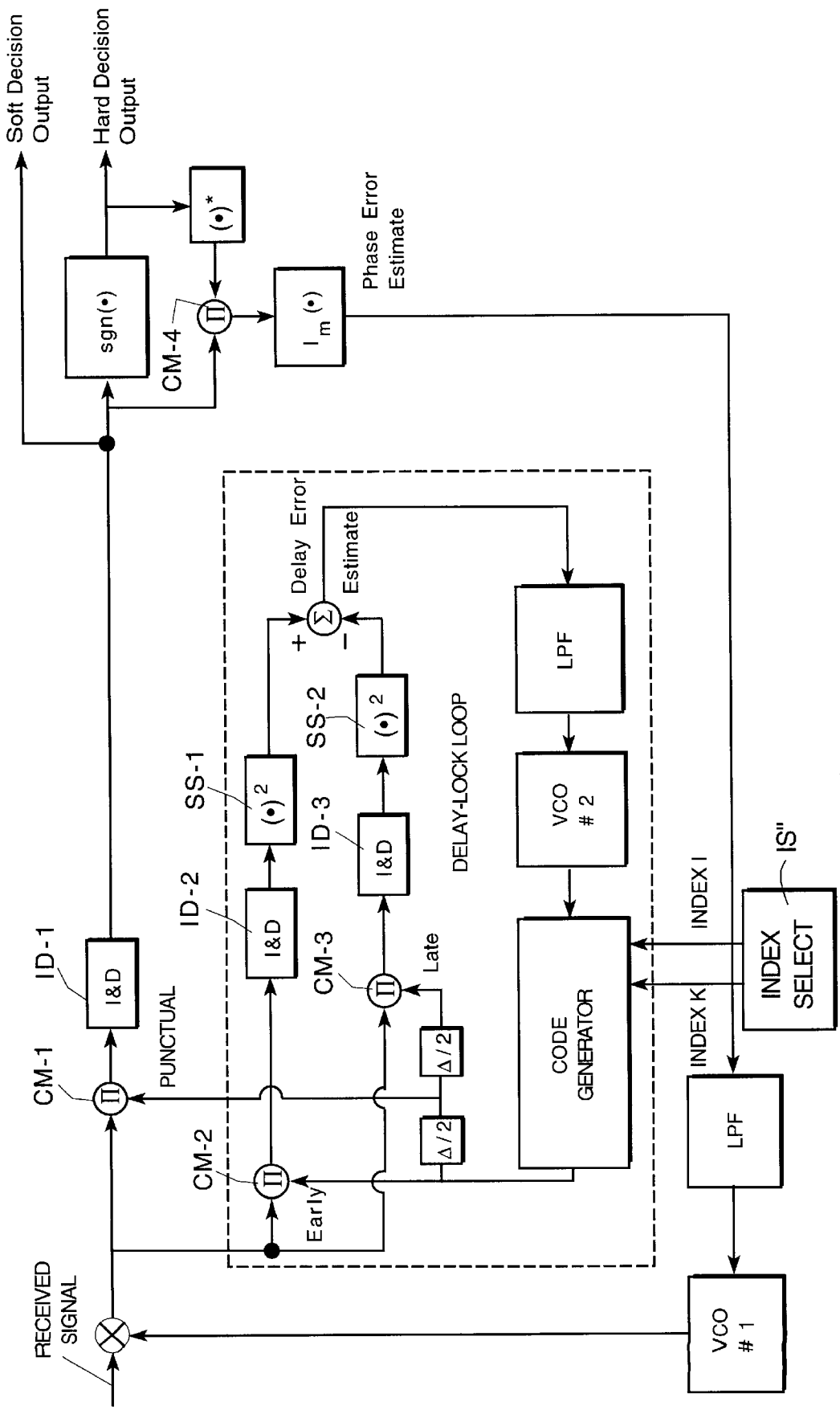
FIG. 4 is a block diagram of the subscriber terminal demodulator for the hybrid QO/OCDMA approach.
Figure 5:
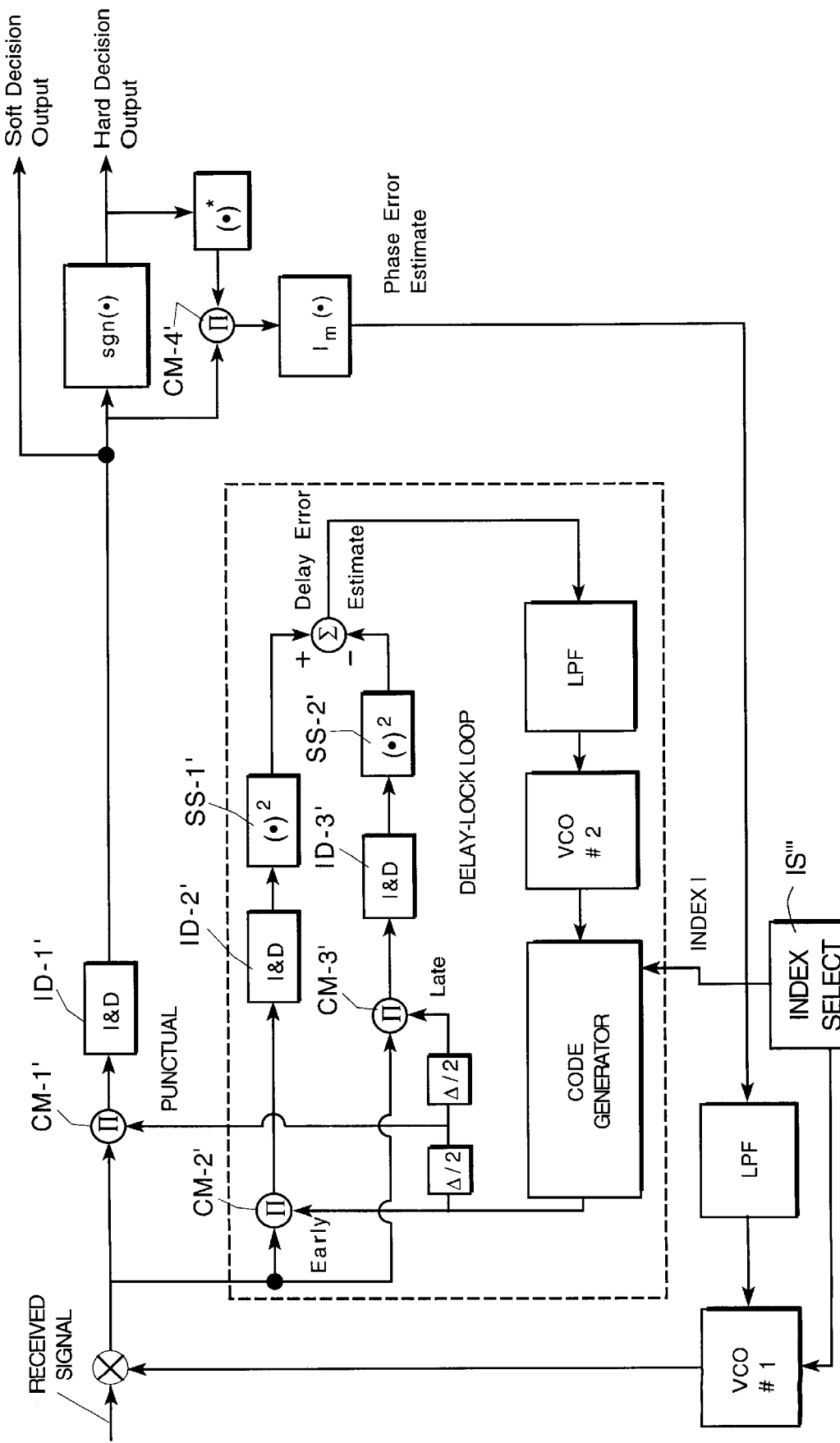
FIG. 5 is a block diagram of the subscriber terminal demodulator for the preferred orthogonal frequency offset approach.

FIG. 1 illustrates the hardware configuration for one system hardware set, e.g., basic single base station system configuration. Each hardware set is comprised of a base station 10 and handsets 11-1, 11-2 . . . 11-N. The system defines a star network configuration with the base station as the center of the star. The base station 10 contains one modem 12 for each individual user handset in the operating system. Each modem 12 contains a modulator 14 (FIG. 2 or FIG. 3) and a demodulator 15 (FIG. 4 or FIG. 5). Modulator 14 receives input signals 16, processes the input signals as described herein, and outputs the processed data signals to up-converter 17, power amplifier 18, diplexer 19, and antenna 25 for transmission to the respective subscriber or mobile stations 11-1, 11-2 . . . 11-N. Received signals on antenna 25 are routed through diplexer 19 to the proper subscriber channel, amplified by a low noise amplifier (LNA) 21, downconverted in downconverter 22, processed by demodulator 15 and outputted on output 26. The data terminals 16 and 26 are coupled to telephone system (TELCO) by an interface (not shown).

Each subscriber station 11 has an antenna system 30 (which may be of the dual cross polarized-type disclosed in the above-identified applications) coupled by diplexer means 31 to the transmit channel or the receive channel.

In the transmit mode, data 32 is input to modulator 33 in subscriber modem 34 (which is illustrated in detail in FIG. 2 or FIG. 3), up-converted in up-converter 35, amplified by a power amplifier 36 and coupled by diplexer 31 to antenna 30 for broadcast to the base station 10. Received signals are coupled by receiver diplexer 37 and a low noise amplifier (LNA) 37 to downconverter 38 and demodulator 39 (FIG. 4 or FIG. 5) and outputted on 40 to a utilization device (not shown). The other subscriber station are similarly structured.

Figure 2:
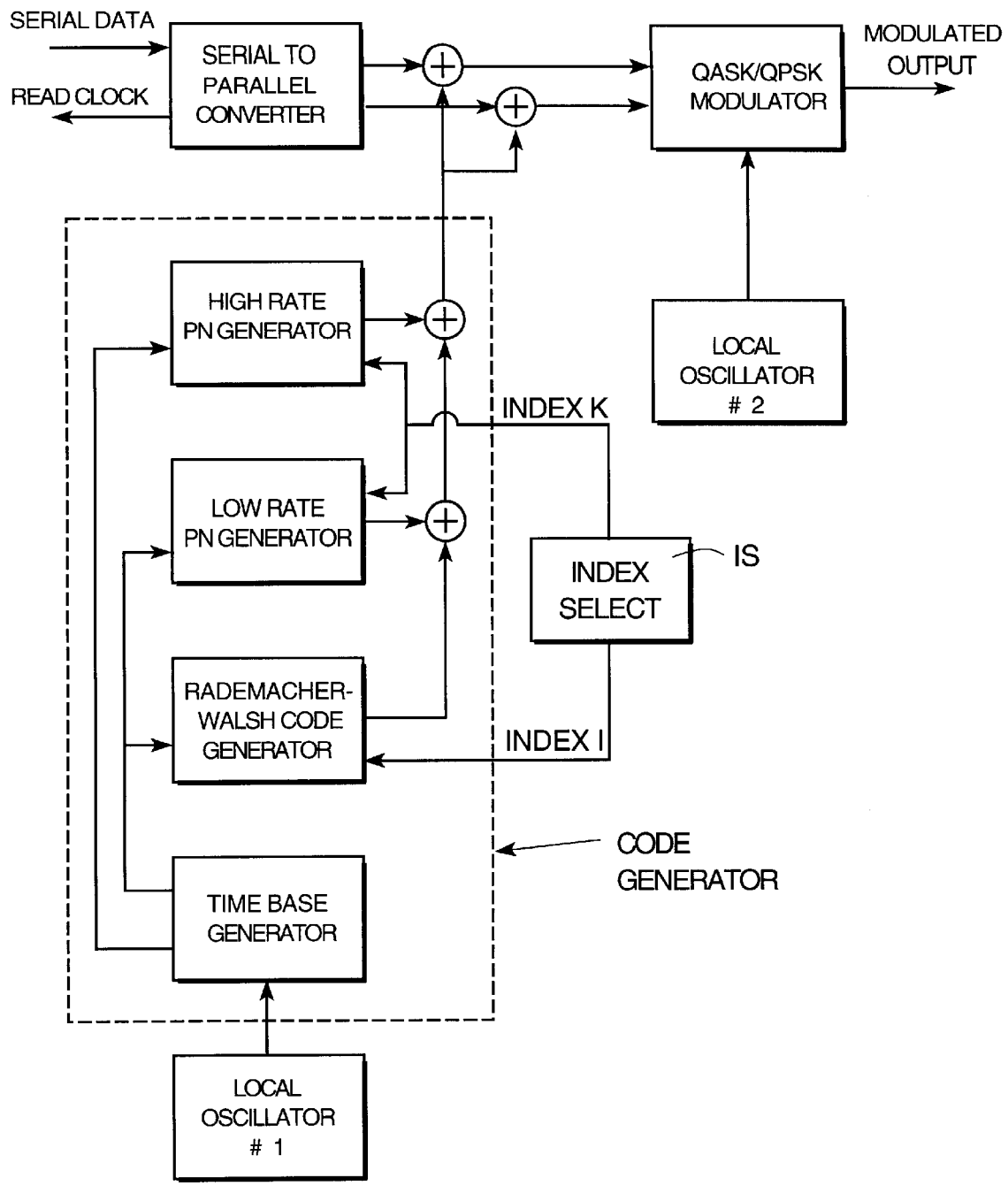
FIG. 2 is a block diagram of the modulator for the first or hybrid QO/OCDMA approach and is based on correlation demodulation.

FIG. 2 is a block diagram of the modulator for the first or hybrid QO/OCDMA approach. The input serial data is converted to two parallel data streams each of which has the composite pseudo-random code modulo-2 added to it. The resulting streams are then applied to a modulator to generate the transmitted signal. Normally QPSK modulation will be employed but higher order modulation may be supported by QASK modulation if greater bandwidth efficiency is required.

The composite pseudo-random code is the mod-2 sum of a RW code and the mod-2 sum of a high-rate and a low-rate PN code. The codes are selected by the index where k is an integer selected from the set $\{1, 2, \ldots K\}$. The index i, which is an integer selected from the set $\{1, 2 \ldots I\}$, determines the RW code and the orthogonal channel. Thus, there are I*K channels in the system. For practical reasons I is usually either 16, 32 or 64. K is limited by the access noise from the other channels. Indexes I and K are provided by index selector IS.

Note that all channels use the same carrier frequency. The modulator shown is the one located at the base stettion. At the subscriber terminal the local oscillator #1 would be replaced with a voltage-controlled oscillator so that the code time base can be corrected as commanded by the base station over the order wire.

Figure 3:
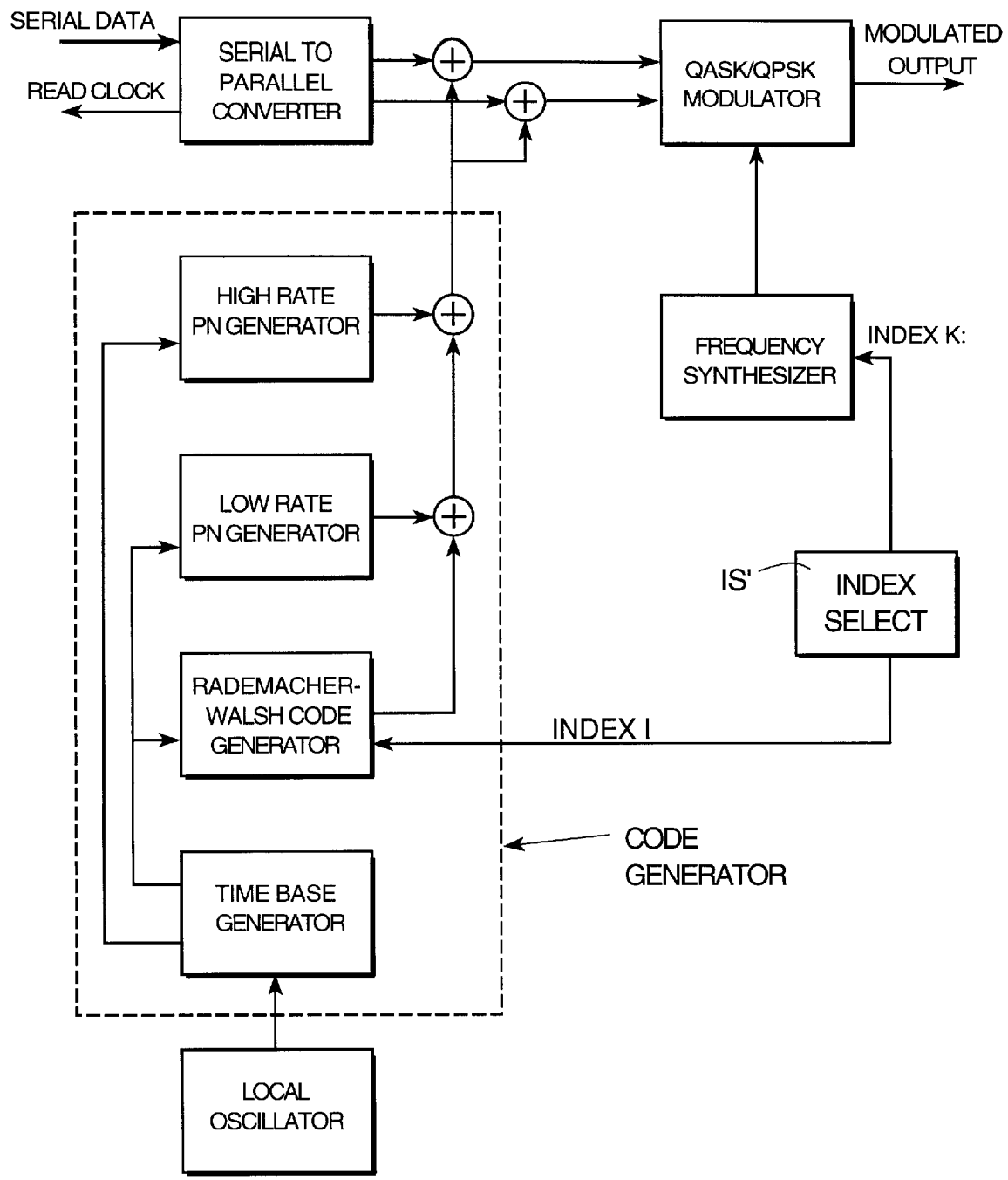
FIG. 3 is a block diagram of the modulator for the preferred orthogonal frequency offset approach, and is based on correlation demodulation.

FIG. 3 is a block diagram of the modulator for the preferred orthogonal frequency offset approach. It is the same as FIG. 2 except that the index k selects orthogonal channels through a frequency synthesizer rather than through code selection.

The demodulators for both approaches are based on correlation demodulation. Code synchronization is achieved through the use of a non-coherent delay-lock loop. As shown in the following block diagrams coherent demodulation is achieved through the use of a decision directed phase-lock loop. However, a more complex block phase estimator can be used and will offer superior performance in fading channels. The demodulator in FIG. 4 inputs received signals to a downconverter which receives an input from voltage controlled oscillator VCO #1. Voltage Controlled Oscillator VCO #1 receives a phase estimate signal from the "punctual" channel, which is low pass filtered LPF. Code generator CG has applied thereto index K and Index I. (The code generator is shown in a dashed box in FIG. 2.) The delay lock loop including the "early" and "late" channels outputs, from a summer a delay error estimate to low pass filter LPF and voltage controlled oscillator VCO #2, as conventional. What is new is the selection of index K and index I wherein there are a multiple of PN chips to achieve a high spreading rate. Each complex multiply circuit and intergrate and dump current (IDC) constitute a correlator. The phase error estimate is derived conventionally to effect coherent demodulation using VCO #1.

As described earlier, the basic difference between the demodulator of FIG. 4 and FIG. 5 is that the selector index I is applied to the PN code generator in FIG. 4 whereas the selector index K applied as further control on VCO #1.

FIG. 4 is a block diagram of the subscriber terminal demodulator for the hybrid QO/OCDMA approach. Complex notation is used to simplify these diagrams. For example, the block denoted I&D corresponds to two real-valued integrate-and-dump circuits.

FIG. 5 is a block diagram of the subscriber terminal demodulator for the preferred orthogonal frequency offset approach. It differs only slightly from FIG. 3.

Demodulators for the base station differ only in that the delay discriminator output is not used to control the local correlator time base. Rather the delay discriminator output is transmitted to the subscriber terminal by way of an order wire as described in U.S. patent now U.S. Pat. No. 5.375.140.

As shown, the system uses frequency-division duplexing to separate transmit and received signals. As indicated in the above-referenced patent, time-division duplexing (TDD) is frequently superior. In order to support TDD the modulator would need to include a compression buffer and the demodulator an expansion buffer as is typical of TDD systems.

While preferred embodiments of the invention have been described and illustrated, it will be appreciated that other embodiments, adaptations and modifications of the invention will be readily apparent to those skilled in the art.

What is claimed is:

1. In an orthogonal code division multiple access (OCDMA) wireless telephone system having a base station and a plurality of mobile transceiver handsets, sending modulator and receiving demodulator means in said base station and each said mobile transceiver handset, respectively, the improvement for making said OCDMA system more tolerant of multipath delay spread, comprising, each said sending modulator means having 8 to 64 PN chips per each Rademacher-Walsh (RW) chip, each receiving demodulator means having a correlator for providing a demodulator output signal; and each modulator means including means for setting the PN chipping rate high enough such that said correlators provide processing gain discrimination against multipath signal components delayed more than a small fraction of a RW chip duration.

2. A process for making an orthogonal code division multiple access (OCDMA) wireless telephone system more tolerant of multipath delay, said OCDMA wireless telephone system having a base station and a plurality of mobile transceiver handsets, modulator and demodulator means in said base station and each said mobile transceiver handset comprising, causing said modulator to have between 8 to 64 PN chips per each Rademacher-Walsh (RW) chip, each demodulator having a correlator for providing a demodulator output signal; the steps of setting the PN chipping rate at a level at each (1) modulator and (2) demodulator such that said correlators provide processing gain discrimination against multipath signal components delayed more than a small fraction of a RW chip duration.

3. In an orthogonal code division multiple access (OCDMA) radio communication system in which a set of orthogonal Rademacher-Walsh (RW) functions are overlaid with a pseudo-noise (PN) sequence forming a coded spreading sequence for an information signal, each orthogonal function of said set carrying voice/data for a single user in said system and a source of selected carrier signals and means to modulate the information signals onto a selected carrier signal to form a transmit signal, said system having a base station and a plurality of mobile transceiver handsets, sending modulator and receiving demodulator means in said base station and each said mobile transceiver handset, respectively, the improvement comprising each said sending modulator means having PN chips in the range of eight to sixty-four PN chips per each RW chip, each receiving demodulator means having a correlator for providing a demodulator output signal and each modulator means including means for setting the PN chipping rate high enough such that the correlator provides processing gain discrimination against multipath signal components delayed more than a small fraction of an RW chip duration.

4. In an orthogonal code division multiple access (OCDMA) radio communication system in which a set of orthogonal Rademacher-Walsh (RW) functions are overlaid with a pseudo-noise (PN) sequence forming a coded spreading sequence for an information signal, each orthogonal function of said set carrying voice/data for a single user in said system and a source of selected carrier signals and means to modulate the information signals onto a selected carrier signal to form a transmit signal, said system having a base station and a plurality of mobile transceiver handsets, sending modulator and receiving demodulator means in said base station and each said mobile transceiver handset, respectively, the improvement comprising each said sending modulator means having PN chips in the range of eight to sixty-four PN chips per each RW chip, each receiving demodulator means having a correlator for providing a demodulator output signal and each modulator means including means for setting the PN chipping rate high enough such that the correlator provides processing gain discrimination against multipath signal components delayed more than a small fraction of an RW chip duration wherein said communications system includes an orthogonal frequency-division multiple access system in which the transmitted signal is given by:

$$S_{ik}(t) = PN_{HR}(t) \cdot PN_{LR}(t) \cdot RW_i(t) \cdot \{\alpha(t) + jb(t)\} \cdot \cos(\omega_o t + \delta \omega \cdot k \cdot t)$$

where $PN_{HR}(t)$ is the high rate PN code for a set of accesses, $PN_{LR}(t)$ is the low rate PN code for set of accesses, $RW_i(t)$ is i-th RW function, $|\alpha(t)+jb(t)|$ is the complex-valued baseband data modulated signal; and book is the amount of angular frequency offsetting which corresponds to $2\pi$ times integer multiples of the RW chipping rate.

* * * * *